(12) United States Patent
Russell

(10) Patent No.: US 9,972,044 B1
(45) Date of Patent: May 15, 2018

(54) SENDING CUSTOM GREETING CARDS WITH GIFTS IN A HIGH VELOCITY ENVIRONMENT

(71) Applicant: Amazon Technologies, Inc., Reno, NV (US)

(72) Inventor: Ryan Scott Russell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 89 days.

(21) Appl. No.: 14/224,692

(22) Filed: Mar. 25, 2014

(51) Int. Cl.
*G06Q 30/00* (2012.01)
*G06F 17/30* (2006.01)
*G06Q 30/06* (2012.01)
*G06Q 10/08* (2012.01)

(52) U.S. Cl.
CPC ....... *G06Q 30/0635* (2013.01); *G06Q 10/083* (2013.01)

(58) Field of Classification Search
CPC ................................................. G06Q 30/0635
See application file for complete search history.

(56) References Cited

U.S. PATENT DOCUMENTS

| | | | | |
|---|---|---|---|---|
| 7,246,706 B1* | 7/2007 | Shakes et al. | ................. | 209/630 |
| 2003/0208556 A1* | 11/2003 | Friedman et al. | ............ | 709/218 |
| 2004/0205138 A1* | 10/2004 | Friedman | ............... | G06Q 30/02 709/206 |
| 2009/0000912 A1* | 1/2009 | Battles | ................. | B65G 1/1371 198/431 |
| 2009/0061093 A1* | 3/2009 | Paz-Pujalt | .............. | G06Q 30/02 427/256 |
| 2009/0234707 A1* | 9/2009 | Perez | ..................... | G06Q 10/08 705/300 |
| 2010/0017278 A1* | 1/2010 | Wilen | .................. | B42D 15/045 705/14.2 |
| 2015/0095213 A1* | 4/2015 | Paintin | ........................... | 705/39 |

OTHER PUBLICATIONS

Smith, L. (Oct. 23, 1999). Out & about / ventura county; shoptalk; holiday hallmark; it's hunting season for cards with custom or preprinted greetings. Los Angeles Times Retrieved from https://search.proquest.com/docview/421582711?accountid=14753.*

* cited by examiner

*Primary Examiner* — Kathleen Palavecino
(74) *Attorney, Agent, or Firm* — Lee & Hayes, PLLC

(57) ABSTRACT

A fulfillment system provides an effective way to send a greeting card with gift items in a high velocity fulfillment environment. When a consumer purchases an item, an order may be sent to the fulfillment system that includes a request for the item and a greeting card. The item may be retrieved from an inventory in a warehouse facility, and transported to a sorting station within the fulfillment system. Concurrently, the greeting card is printed on-demand at a recordation station and transported to the same sorting station within the fulfillment system. At the sorting station, the fulfillment system detects the presence of the item and the greeting card and initiates a process to package the item and greeting card in a shared container.

19 Claims, 9 Drawing Sheets

SENDING CUSTOM GREETING CARDS WITH GIFTS IN A HIGH VELOCITY ENVIRONMENT

BACKGROUND

Traditionally, the gifting experience has included not only the provision of a gift, but additionally a greeting card containing a personal message. Modern electronic marketplaces, such as those accessible via the internet, may provide customers the opportunity to purchase gifts from a catalog of available items or products. Many electronic gifting experiences, however, fail to provide adequate means for the inclusion of a greeting card. For instance, electronic marketplaces typically limit a customer to adding a text message to a sheet of paper used as a packaging slip.

Further, the operator of an electronic marketplace may operate a fulfillment system including various facilities in order to process customer orders. For instance, the fulfillment system may include a facility that prepares shipments of purchased items. Additionally, expanding the size or capabilities of many fulfillment systems requires significant changes to existing infrastructure and equipment. As a result, the cost of incremental changes to the capacity or functionality may be prohibitively expensive, thereby limiting the ability of the fulfillment system to accommodate the inclusion of a high quality greeting card with a gift purchase.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
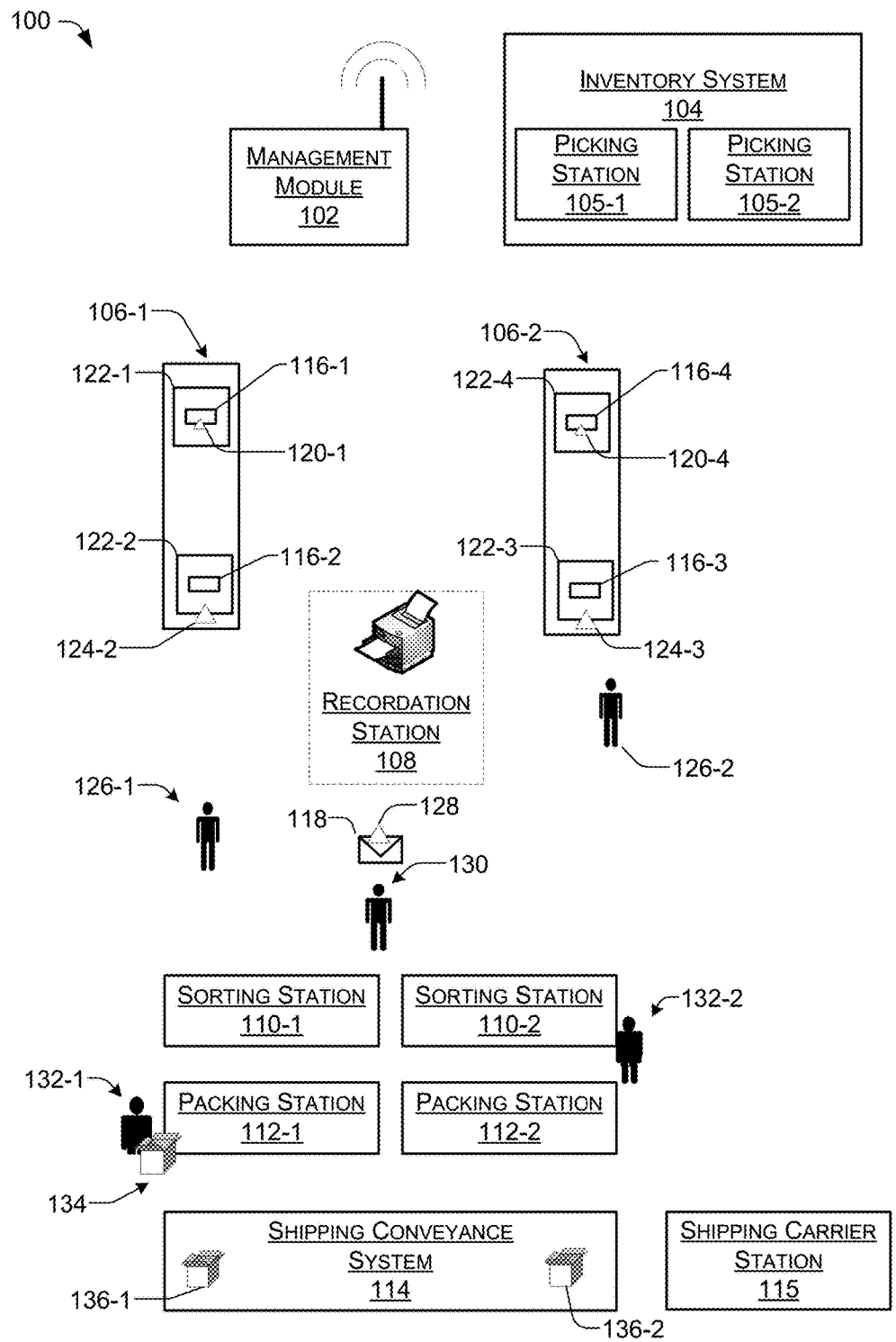
FIG. 1 illustrates an exemplary system architecture for shipping recorded media with gift items in a high velocity fulfillment environment.

This disclosure includes techniques and arrangements for sending recorded media with gift items in a high velocity fulfillment environment. To use a simple illustration, an order requesting one or more gift items and a greeting card may be sent to a fulfillment system in a distribution warehouse. Accordingly, in some cases, the order may be sent to a management module of the fulfillment system. The management module may control administration and coordination of certain elements and/or tasks within the fulfillment system. The management module may issue tasks for the retrieval of each gift item to the inventory system, and send a print job including instructions to print the greeting card to a print station. In doing so, the management module may coordinate the various tasks such that all of the orders received by the management module are fulfilled in an efficient manner.

Once a gift item is retrieved from the inventory system, the gift item is placed into a receptacle, typically with one and only one gift item per receptacle. In some implementations, one or more gift items belonging to the same order may share a receptacle. It is noted that receptacle, as used herein, may include, but is not limited to, any tote, basket, box, tray, or similar mechanism configured to receive one or more items or groups of items in a fulfillment system. In some implementations, an association between the gift item and the receptacle may be formed under the direction of the management module and tracked in a database.

Once the retrieved gift items are placed into the receptacles, the receptacles may be inducted into or placed on a conveyance system to be transported to a sorting station for further processing of the gift items. The conveyance system may be coupled to and controlled by the management module of the fulfillment system via wired and/or wireless communications. The management module may receive input from and send commands to the conveyance system to direct or control various operations of the conveyance system.

The management module may send the print job to the printing station when one or more of the gift items are placed into the receptacles. In the alternative, the print job may be communicated to the print station when one or more of the receptacles arrive at the sorting station or at other junctures during conveyance. In some implementations, communication of the print job to the print station may be dynamically based in part on any number of factors, including capacity, throughput, and/or projected load of the fulfillment system and/or various functional regions within the fulfillment system. The print station may execute the print job and print the greeting card in accordance with the instructions received from the management module. In some examples, the greeting card may be manually or automatically placed into an envelope at the printing station. Furthermore, the printing station may include a human operator and/or automated equipment to transport the greeting card to the sorting station.

Once a receptacle or greeting card arrives at the sorting station, the gift item and greeting card are physically associated with one another. In one implementation, the management module may activate an indicator of an assigned slot of the sorting station that designates the holding destination for the greeting card or the gift item in the receptacle. The slots may be shelves, or some other receptacle or location. An operator at the station may then transport the gift item and greeting card to the assigned slot. In an alternative implementation, transportation of the gift items and/or greeting card to the slot may be performed by automated mechanisms, which may be coupled to and under the control of the management module. In some implementations, the management module may determine the slot assignment based in part on the availability of the slots of the sorting station, size of the slots of the sorting station and/or the proximity of a slot to a conveyance system and/or printing station associated with an order.

The management module may track the status of each gift item and greeting card. When the greeting card and all of the gift items of the order are placed in the assigned slot of the sorting station, the contents of the slot are moved to a packing station. At the packing station, the gift items and greeting card are placed into a shipping container (e.g., box, envelope, etc.), and prepared for shipping.

For discussion purposes, some example implementations are described in the environment of sending greeting cards with gift items in a high velocity fulfillment system. However, the implementations herein are not limited to the particular examples provided, and may be extended to other types of printed items and other recordable media, as will be apparent to those of skill in the art in light of the disclosure herein.

FIG. 1 shows one illustrative example of a fulfillment system 100 that may be used to implement a technique for shipping recorded media with gift items in a high velocity fulfillment environment. The fulfillment system 100 may be arranged in a facility or warehouse (e.g., distribution facility, fulfillment center, etc.) that is logically organized into areas or regions associated with various functions. In the illustrated example, the warehouse includes a management module 102, an inventory system 104, one or more picking stations such as stations 105-1 and 105-2, a conveyance system 106, a recordation station 108, one or more sorting stations such as stations 110-1 and 110-2, one or more packing stations such as stations 112-1 and 112-2, a shipping conveyance system 114 and a shipping carrier station 115. In practice, depending upon the size of the fulfillment system 100, the warehouse may hold more than one of the inventory system 104, picking station 105, conveyance system 106, recordation station 108, sorting station 110, packing station 112, shipping conveyance system 114 and shipping carrier station 115. Alternatively, the warehouse may be configured without one or more of the inventory system 104, picking station 105, conveyance system 106, recordation station 108, sorting station 110, packing station 112, shipping conveyance system 114 and shipping carrier station 115.

In the illustrated example, the management module 102 may receive an order requesting one or more items 116 stored in the inventory system 104 and a recorded media 118. The order may be initiated by a consumer purchase at an electronic marketplace (e.g., websites, peer-to-peer systems, etc.). For example, a consumer may visit an electronic marketplace where goods and/or services are bought and sold among participants. The consumer may submit an order requesting one or more items as a gift for an acquaintance and a greeting card to accompany the one or more items. The order may be communicated to the management module 102 to be fulfilled by the fulfillment system 100. The management module 102 may issue tasks for the retrieval of the one or more items 116 to the inventory system 104, and send instructions to produce the recorded media 118 to the recordation station 108. The management module 102 may determine the locations of the items 116 within the inventory system 104. The items 116 may, for instance, be stored in different areas within the inventory system 104.

The inventory system 104 may include one or more picking stations 105 that retrieve items 116 from the inventory system 104. The picking stations 105 may include one or more human operators and/or automated equipment to retrieve the desired order items 116 from the inventory system 104. At any one time, picking stations 105 may each be picking items 116 from the inventory system 104 to fulfill portions or all of one or more requests or orders under the direction of the management module 102.

Each item 116, such as items 116-1, 116-2, . . . , may include an item identifier 120, such as identifiers 120-1, 120-2, . . . . The term item identifier refers to a unique identifier associated with each item 116 carried in the inventory system 104 of the fulfillment system 100. Typically, but not necessarily, each item 116 is tagged or otherwise marked with the item identifier 120. For example, items 116 may be marked or tagged with a bar code, 2D/3D bar code, Quick Response (QR) code, Near Field Communication (NFC) tag, Radio Frequency Identifier Device (RFID) tag, magnetic stripe, Universal Product Code (UPC), Stock-Keeping Unit (SKU) code, serial number, and/or other designation (including proprietary designations) that may be used as item identifiers 120 to facilitate fulfillment system operations.

Once the one or more items 116 have been retrieved from the inventory system 104, the items 116 may be placed into one or more receptacles 122. The receptacles 122 may be delivered or transported to the sorting station 110 by the conveyance system 106. The receptacles 122 may be inducted into or placed on the conveyance system 106 to be transported to the sorting station 110 for further processing of the items 116. In some implementations, a receptacle 122 may already be on the conveyance system 106 when the item 116 is placed into the receptacle 122. Alternatively, the receptacle 122 may be retrieved from a receptacle storage area, the item 116 may be placed into the receptacle 122, and the receptacle 122 may then be inducted or placed onto the conveyance system 106. Conveyance of the receptacles 122 to the sorting station 110 by the conveyance system 106 may be performed by any of a variety of means, including but not limited to, manually carrying the receptacles, manual push carts, motorized carts, and induction onto automated conveyance mechanisms. The conveyance system 106 may be operatively coupled to and controlled by the management module 102 of the fulfillment system 100 via wired and/or wireless communications. The management module 102 may receive input from and send commands to the conveyance system 106 to direct or control various operations of the conveyance system 106.

Each receptacle 122 may be associated with a unique receptacle identifier 124 that identifies the particular receptacle 122 in the fulfillment system 100. The receptacle identifier 124 may, for example, be implemented as a bar code, 2D/3D bar code, QR code, NFC tag, RFID tag, magnetic stripe, or some other scannable or readable mechanism, mark, or tag attached to or integrated with the receptacle 122.

Each item 116 may be temporarily associated with a receptacle 122, such as when the item 116 is initially placed in to the receptacle 122. The association of an item 116 with a receptacle 122 may be performed by reading, scanning, or otherwise entering the item identifier 120 and the receptacle identifier 124 associated with the receptacle 122 into which the item 116 is placed. This may be performed manually (e.g., by an operator using a hand-held scanner/sensor), via an automated scanning/reading process using fixed scanners/readers, or by a combination of manual and automatic scanning/reading. Once scanned or otherwise entered, the item identifier 120 and receptacle identifier 124 may be maintained in memory at the management module 102 to track the temporary association.

In FIG. 1, the conveyance system 106 is assigned agents 126 that are responsible for transporting the receptacles 122 to the sorting station 110. In this illustration, the agents 126 are human operators, although the agents 126 may alternatively or additionally involve an automated transport apparatus for transporting the receptacle 122 to the sorting station 110.

Further, FIG. 1 illustrates a one-to-one relationship between the conveyance systems 106-1 and 106-1 and the sorting stations 110-1 and 110-2. Alternatively, a single sorting station 110-1 may be associated with a plurality of conveyance systems 106, or in other arrangements, a single conveyance system 106-1 may be associated with a plurality of sorting stations 110.

As noted above, the management module 102 may send a recordation job to the recordation station 108 when one or more of the items 116 are initially placed into the one or more receptacles 122. In the alternative, the recordation job may be communicated to the recordation station 108 when one or more of the receptacles 122 arrive at the sorting station 110. The recordation job may include, at least, instructions to produce the recorded media 118 at the recordation station 108. In some implementations, communication of the recordation job to the recordation station 108 may be dynamically based in part on the capacity, throughput, and/or projected load of the fulfillment system 100 and/or various regions within the fulfillment system 100.

The recordation station 108 may execute the recordation job and produce a recorded media 118. In some implementations, the recordation job may include instructions for the generation of the recorded media 118 in the form of a printed card. The card may be a greeting card, coupon, promotional material, promotional offer, or advertisement. In some examples, the greeting card may be manually or automatically placed into an envelope.

In some scenarios, the recorded media 118 is requested by the consumer when purchasing the associated item, such as requesting a greeting card (e.g., birthday card, anniversary card, etc.) In some examples, an electronic marketplace may provide vendors an opportunity to offer for sale a greeting card design and/or license to a greeting card design. Customers who have made a purchase comprising a gift may be permitted to browse a catalog of greeting card designs including vendor supplied designs. Furthermore, when a customer purchases a vendor supplied greeting card design, the vendor may receive a payment from the electronic marketplace operator. In some examples, the vendor may set the price of the greeting card. Further, the electronic marketplace operator may receive a commission for the sale and/or licensing of the greeting card design.

In other scenarios, the recorded media 118 may be produced by the recordation station 108 and shipped with items 116 without a request by the consumer that has ordered the items 116 and likely without any foreknowledge by the consumer. For example, a coupon for an item or service associated with the consumer's actions may be printed at the recordation station 108 and shipped with the items 116 of the order. In some cases, the recorded media may be generated based in part on actions of the consumer as monitored over time by the online merchant system to tailor the recorded media to the consumer's traits, interests, purchase or browsing history or profile.

In some examples, an electronic marketplace may provide an interface to a customer that permits the customer to provide information to incorporate into the printing of a printed card. The information provided by the customer may be used to alter the style, appearance, graphical and/or textual content, font, typeface, color schema, layout, card size, card medium quality and/or card medium texture. In some examples, a customer may provide their own greeting card design to an interface of the electronic marketplace operator for printing at the recordation station 108. For example, a user may upload a greeting card design to the electronic marketplace and have the design printed at the recordation station 108.

In some implementations, the recordation station 108 may comprise a three dimensional printing system. For example, the recordation job may include instructions to print a three dimensional object in accordance with a computer design, such as a CAD file.

In some implementations, the recordation station 108 may comprise a system capable of recording computer data to a computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the computer data and which can be accessed by a computing device. For example, the recordation job may include instructions to record software and/or digital content (e.g., electronic book, digital music, digital video, etc.) to a CRSM.

In some examples, a customer may provide computer data to record on the CRSM. For example, a customer may record a video message expressing birthday wishes to a family member, and upload the video message to the electronic marketplace. The video message may then be recorded to a CRSM, and the CRSM may be packaged with a birthday gift.

The recorded media 118 may be tagged with a recorded media identifier 128 provided by the management module 102. In some examples, the management module 102 may generate the recorded media identifier 128. The recorded media identifier 128 may, for example, be indicated by a bar code, 2D/3D bar code, QR code, NFC tag, RFID tag, magnetic stripe, or some other scannable or readable mechanism, mark, or tag attached to or integrated with the recorded media 118.

In FIG. 1, the recordation station 108 is assigned agents 130 that are responsible for transporting the recorded media 118 to the sorting station 110. In this illustration, the agents 130 are human operators, although the agents 130 may alternatively or additionally involve an automated transport apparatus for transporting the recorded media 118 to the sorting station 110.

Once a receptacle 122 or recorded media 118 is at or near the sorting station 110, the receptacle identifier 124 or recorded media identifier 128 may be manually or automatically scanned or read. The management module 102 may then activate an indicator that identifies an assigned slot of the sorting station 110 that is the correct destination for the item 116 in the receptacle 122 or the recorded media 118. The slots may be shelves, or other receptacles, or some other location to temporarily hold the items and/or recorded media.

The slot indicator at the sorting station 110 may be a light, an audio signal, or some other mechanism or combination of mechanisms capable of conveying audio, visual, and/or other information to a human operator. Alternatively, the indicator may be textual or graphical directions displayed on a monitor of a computer, hand-held device, or printed paper. A sorting agent 126 at the sorting station 110 may transport the receptacle 122 to the sorting station 110 and place the items 116 in the assigned slot. Further, a sorting agent 130 at the sorting station 110 may transport the recorded media 118 to the sorting station 110 and place the recorded media 118 in the assigned slot. In an alternative implementation, transportation of the items 116 or recorded media 118 to the slot may be performed by automated mechanisms, which may be operatively coupled to and under the control of the management module 102. In some implementations, the management module 102 may determine slot assignment based in part on the availability of the slots of the sorting station 110, and/or the proximity of a slot to the conveyance system 106 and/or recordation station 108 associated with an order.

When the management module 102 detects that an order has been completed (i.e., that all the items 116 for the order have been placed in the assigned slot along with the recorded media 118), the management module 102 may indicate that the contents of the slot are ready to be transported to the packing station 112. The indicator may be a light, an audio signal, or some other mechanism or combination of mechanisms capable of conveying audio, visual, and/or other information to a human operator. Alternatively, the indicator may be textual or graphical directions displayed on a monitor of a computer, hand-held device, or printed paper. A packing agent 132 at the packing station 112 may then transport the items 116 and recorded media 118 placed in a slot associated with a completed order to the packing station 112.

In FIG. 1, the packing station is assigned packing agents 132 that are responsible for transporting the contents of a slot to the packing stations 112, and packing the slot contents into empty shipping containers 134. In this illustration, a packing agent, 132-1, is shown next to a shipping container (e.g., boxes, envelopes, etc.) 134 that is ready to be packed with the items 116 and recorded media 118 of a completed order. Further, packing agent, 132-2, is shown at the sorting station 110-2 retrieving the items 116 and recorded media 118 from a slot associated with a completed order. It is noted that two packing agents are merely representative, and that packing stations may be designed with more or fewer than two agents.

In an alternative implementation, the contents of the slot may be transported to the packing station 112 by automated mechanisms, which may be coupled to and under the control of the management module 102.

In this illustration, packed shipping containers 136 have been placed on a shipping conveyance system 114 that transports the shipping containers 136 to a shipping carrier station 115. The packed shipping containers 136 may be placed onto the shipping conveyance system 114 by agents 132 at the packing station 112.

Together the management module 102, recordation station 108 and sorting station 110 facilitate the packaging of gifts purchased on an electronic marketplace with high quality greeting cards without the need for costly alteration to pre-existing high velocity fulfillment environments. By assigning each greeting card an identifier 128 and placing the recordation station 108 in the proximity of the sorting station 110, printed media produced at the recordation station 108 may be managed similarly to the purchased gifts, thus affording the printing process at the recordation station 108 the well recognized benefits of the high velocity environment in a scalable implementation.

Figure 2:
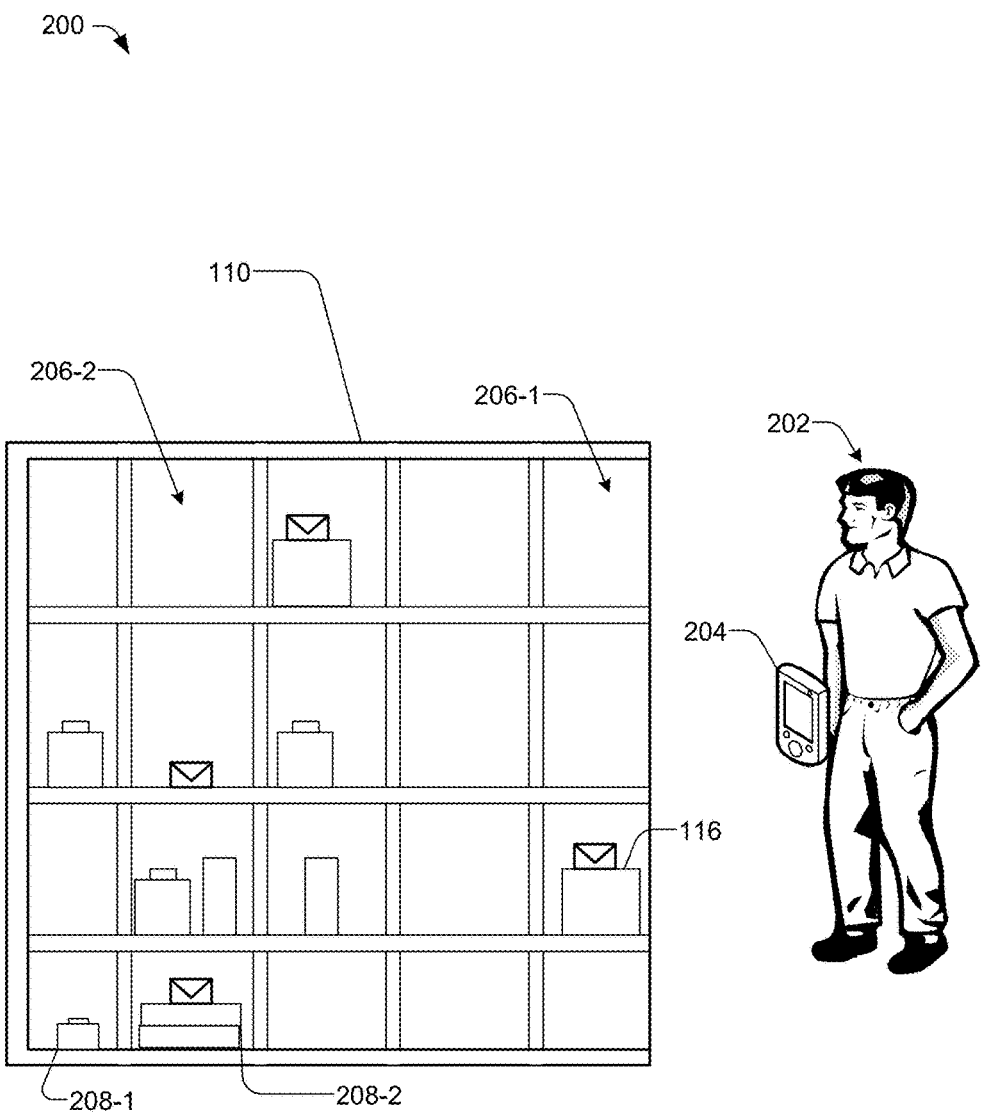
FIG. 2 illustrates a side-view illustration of a sorting station according to some implementations.

FIG. 2 illustrates a side-view illustration of a sorting station, according to one embodiment. In this illustration, a human operator 202 is at rest at the sorting station 110 with a sensing device 204, such as an image sensor (e.g., a 3D image sensor) and/or an ID sensor. In some examples, the sensing device 204 may be one or more fixed, hand-held, and/or mobile readers, scanners, or scanning devices that may be able to scan, receive or otherwise detect mechanisms, marks and/or tags (e.g., a bar code, 2D/3D bar code, QR code, NFC tag, RFID tag, magnetic stripe, etc.).

The sorting station 110 has multiple slots 206, such as slots 206-1, 206-2, . . . , that support a variety of sorted objects 208, such as sorted objects 208-1, 208-2, . . . . Only some of the slots are shown with the reference number 206 for ease of illustration. In some implementations, the sorting station 110 may include slots 206 of varying sizes so that an order of small objects 208-1 does not necessarily occupy an entire larger slot 206-2. The sorting station 110 has open side faces to facilitate sorting of the objects 208 into slots 206 and retrieval of the sorted objects 208 from the slots 206, either through the same open side face (e.g., a front side face) or an opposite open side face (e.g., a rear side face).

The sorted items 208 represent any objects that have been organized by order and placed into a slot 206 at the sorting station 110. Under the supervision of the management module 102, the human operator 202 may retrieve the receptacle 122 (not shown in FIG. 2) from the conveyance system 106 (not shown in FIG. 2) and place the item 116 held in the receptacle 122 into a slot 206 of the sorting station 110. When the human operator 202 retrieves the receptacle 122 from the conveyance system 106, the human operator 202 may read, scan, or otherwise enter the receptacle identifier 124 (not shown in FIG. 2) using the sensing device 204 to determine the slot 206 of the sorting station 110 assigned to the item 116 held within the receptacle 122. Alternatively, the receptacle identifier may be automatically read by the sensing device 204 as the receptacle enters or approaches the sorting station 110. In this example, the human operator 202 may simply remove the item 116 from the receptacle 122, identify the slot 206 of the sorting station 110 assigned to the item 116, and place the item 116 into the slot 206. In some implementations, the location of the slot 206 may be determined in accordance with the process described below with reference to FIG. 8.

Further, the human operator 202, under the supervision of the management module 102, may retrieve the recorded media 118 (not shown in FIG. 2) from the recordation station 108 (not shown in FIG. 2) and place the recorded media 118 into a slot 206 of the sorting station 110. When the human operator 202 retrieves the recorded media 118 from the recordation station 108, the human operator 202 may read, scan, or otherwise enter the recorded media identifier 128 (not shown in FIG. 2) using the sensing device 204 to determine the slot 206 of the sorting station 110 assigned to the item 116 held within the receptacle 122. In some implementations, the location of the slot 206 may be determined in accordance with the process described below with reference to FIG. 8.

When the management module 102 detects that an order is complete, the sorted objects 208 placed in the slot 206 may be retrieved from the slot 206 under the direction of the management module and routed to the packing station 112 (not shown in FIG. 2).

Figure 3:
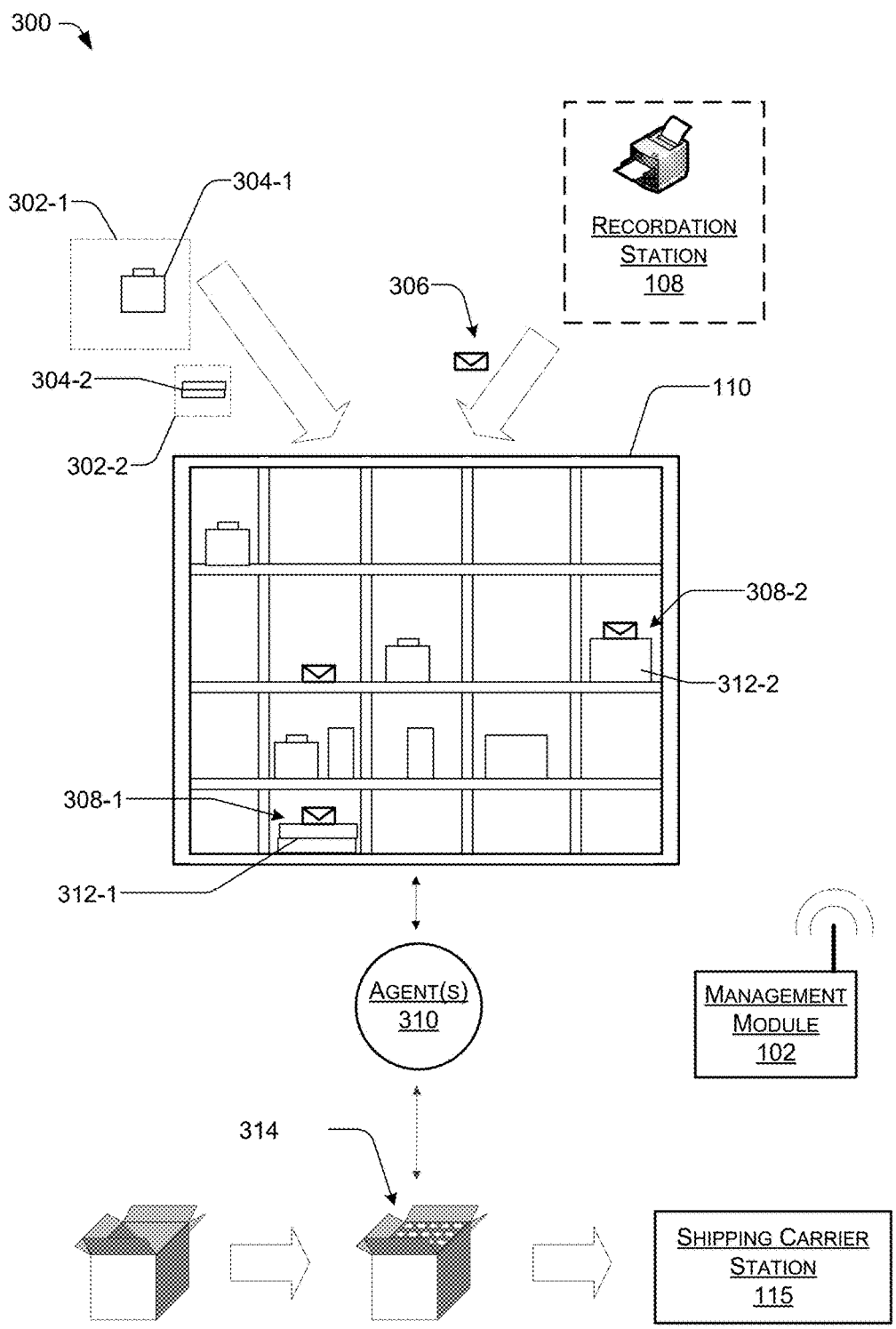
FIG. 3 illustrates an exemplary layout of the fulfillment facility according to some implementations.

FIG. 3 illustrates an exemplary layout of the fulfillment facility. At any one time, one or more receptacles 302, such 302-1, 302-2, . . . , containing items 304, such as 304-1, 304-2, . . . , may be transported via the conveyance system 106 (not shown in FIG. 3) to fulfill one or more orders. In addition to items 304, an order may also include a request for a recorded media 306 from a recordation station 108. This may result in the routing of receptacles 302 and the recorded media 306 to the sorting station 110 under the direction of the management module 102.

At the sorting station, the items 304 may be removed from the receptacles 302 and placed into one or more slots 308, such as 308-1, 308-2, . . . , of the sorting station 108. Further, the recorded media 306 may be placed into the slot 308 of the sorting station 108. The slot 308 may be, but is not necessarily, empty when the items 304 or the recorded media 306 are placed in the slot 308.

When the management module 102 detects that an order has been completed, the management module 102 may instruct an agent 310 at the packing station 112 (not shown in FIG. 3) to retrieve sorted objects 312-1 from the slot 308-1 of the sorting station 110. At the packing station 112, the sorted objects 312-1 may be placed into one or more shipping containers 314 assigned to the order by the management module 102. Once all the sorted objects 312 for a particular order are retrieved from the slot 308 of the sorting station 110 and placed into shipping containers 314, the shipping containers 314 may be sent to the shipping carrier station 115.

Figure 4:
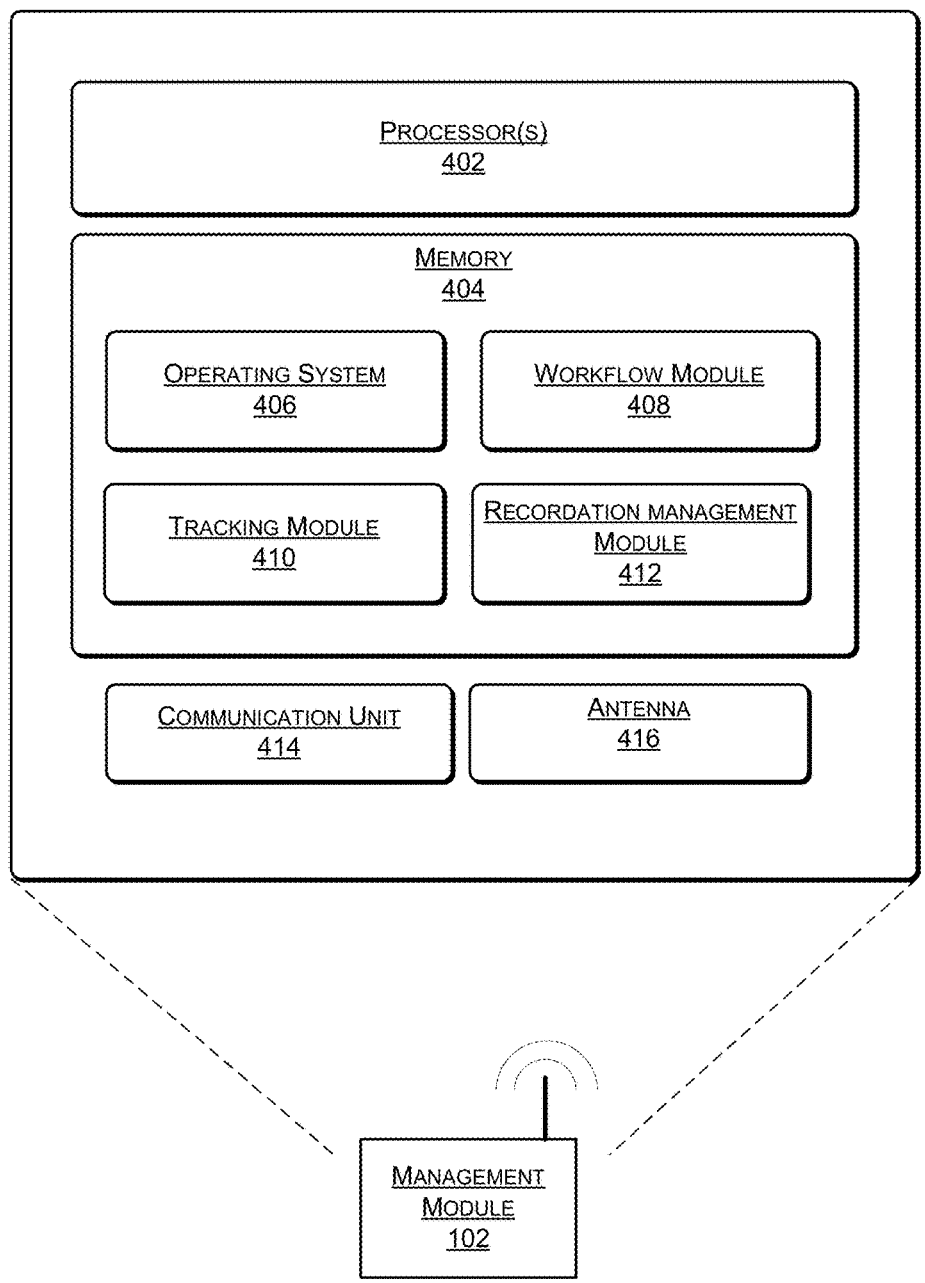
FIG. 4 illustrates select components of one or more exemplary management modules of a fulfillment system according to some implementations.

FIG. 4 shows select components in the management module 102 according to one possible implementation. The management module 102 may be implemented by one or more computers having processing, memory, and communications capabilities. The management module 102 may be a dedicated device, or a general computer system programmed to perform the management operations.

In FIG. 4, the management module 102 includes one or more processors 402 and memory 404. The processor(s) 402 are configured to execute instructions, such as those instructions stored in memory 404, or in other memory accessible to the processor(s) 402, such as storage in cloud-based resources. The memory 404 may include CRSM. The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules, such as instructions, datastores, and so forth may be stored within the memory 404 and configured to execute on a processor(s) 402. An operating system module 406 is configured to manage hardware and services within and coupled to the management module 102 for the benefit of other components.

A workflow module 408 may provide a list of tasks to fully perform the fulfillment process, or may provide instructions as-needed for the routing of the items 116 and the recorded media 118 through the facility. In that way, the management module 102 may either micro manage each movement of the items 116 and the recorded media 118 throughout a fulfillment process, or may simply provide a plan and timing for the regions of the fulfillment system 100 to carry out on their own independently of further instructions.

A tracking module 410 is configured to locate and identify items 116 (not shown in FIG. 4), receptacles 122 (not shown in FIG. 4) and recorded media 118 (not shown in FIG. 4) throughout the fulfillment system 100. In some examples, the tracking module 410 may include a data structure that stores temporary associations between item identifiers 120, receptacle identifiers 124 and recorded media identifiers 128.

A recordation management module 412 is configured to send a recordation job to the recordation station 108 and manage completion of the recordation job. In some examples, the recordation management module 412 may receive recordation data requesting the recorded media 118. Further, the recordation management module 412 may convert the recordation data into a recordation job and output the recordation job to the recordation station 108. In some examples, the recordation job includes recordation instructions and/or commands that instruct the recordation station 108 to produce the requested recorded media 118. The recordation job may include instructions for the media type, content, fonts, styling, etc., along with metadata to associate the eventual recorded media 118 with the item 116. For instance, the recordation job may be a print job comprising printing instructions that may be interpreted by a printer to print a greeting card according to specifications received in a customer order.

The management module 102 further includes a communication unit 414 to communicate with various regions of the fulfillment system 100 or with other computing devices. The communication unit 414 enables access to one or more types of networks, including wired and wireless networks. More generally, the coupling between the management module 102 and any components in the inventory system may be via wired technologies, wireless technologies (e.g., RF, cellular, satellite, Bluetooth, etc.), or other connection technologies. When implemented as a wireless unit, the communication unit 414 uses an antenna 416 to send and receive wireless signals.

Figure 5:
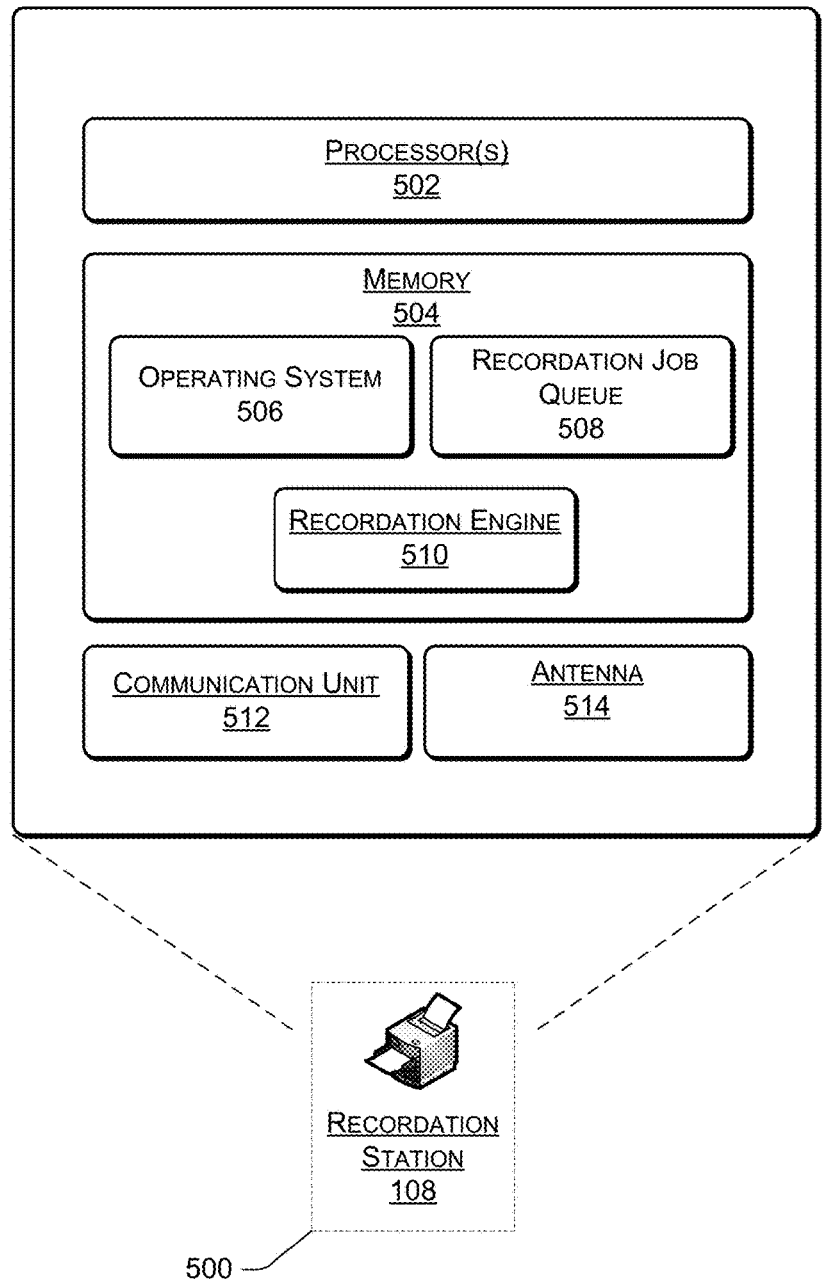
FIG. 5 illustrates select components of one or more exemplary recordation stations of a fulfillment system according to some implementations.

FIG. 5 shows select components in the recordation station 108 according to one possible implementation. The recordation station 108 may be implemented by one or more computers having processing, memory, and communications capabilities. The recordation station 108 may be a dedicated device, or a general computer system programmed to perform recordation operations.

In FIG. 5, the recordation module 108 includes one or more processors 502 and memory 504. The processor(s) 502 are configured to execute instructions, such as those instructions stored in memory 504, or in other memory accessible to the processor(s) 502, such as storage in cloud-based resources. The memory 504 may include CRSM. The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules, such as instructions, datastores, and so forth may be stored within the memory 504 and configured to execute on a processor(s) 502. An operating system module 506 is configured to manage hardware and services within and coupled to the recordation station 108 for the benefit of other components. A recordation job queue module 508 is configured to receive recordation jobs including instructions from the management module 102 (not shown in FIG. 5), and manage the recordation jobs through to completion.

A recordation engine 510 is configured to execute the instructions of the recordation job. As such, the recordation engine 510 may perform the recording within the recordation station 108. Recordation engine 510 represents, generally, any combination of hardware and programming configured to perform a recordation process on a medium. In some examples, the recordation engine 510 is constituted by a sheet feed mechanism and executes printing on a print recording medium such as paper. In some examples, the recordation engine 510 operates within a three dimensional printing system to build a three dimensional object from one or more materials such as, for example, metals, droplets of plastic, or any other appropriate material. In yet another example, the recordation engine 510 may be one or more recording modules, systems, and/or devices operable to record and/or store data (e.g., CD/DVD recorder).

The recordation station 108 further includes a communication unit 512 to communicate with the management module 102 or with other computing devices. The communication unit 512 enables access to one or more types of network, including wired and wireless networks. More generally, the coupling between the management module 102 and any components in the inventory system may be via wired technologies, wireless technologies (e.g., RF, cellular, satellite, Bluetooth, etc.), or other connection technologies. When implemented as a wireless unit, the communication unit 512 uses an antenna 514 to send and receive wireless signals.

Figure 6:
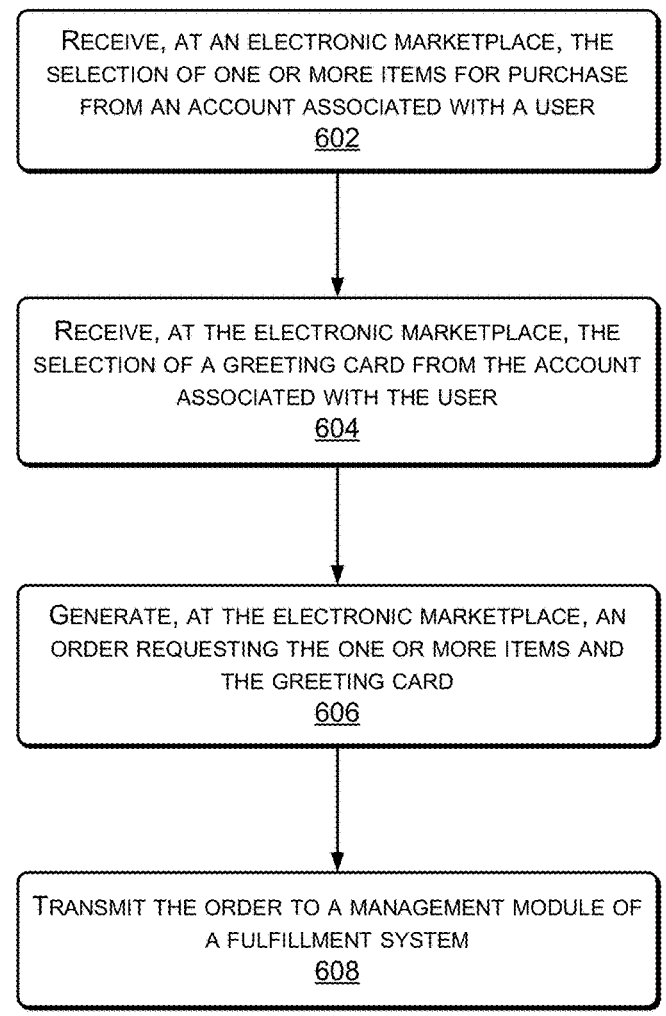
FIG. 6 is a flow diagram illustrating an exemplary process executed by one or more computing devices for generating an order request within a fulfillment system.

FIG. 6 shows the request generation process 600 that may be implemented by the fulfillment system 100. The process is illustrated as a collection of blocks in a logical flow graph. Some of the blocks represent actions taken by an electronic marketplace and the management module 102. In the context of software-based operations, the blocks represent computer-executable instructions stored on one or more computer-readable storage media that, when executed by one or more processors, direct the electronic marketplace and the management module 102 to perform the recited acts. The order in which the operations are described is not intended to be construed as a limitation, and any number of the described blocks can be combined in any order or in parallel to implement the processes. It is understood that the following processes may be implemented with other architectures than the fulfillment system 100 described above.

At 602, an electronic marketplace receives selection of one or more items for purchase from an account associated with a user. For example, a user may use an account on an electronic marketplace to purchase a bicycle as a birthday gift for a friend.

At 604, the electronic marketplace receives selection of a greeting card to accompany the one or more items. For example, the user may further select a personalized birthday card comprising birthday wishes and a statement regarding the bicycle. In some examples, the user may further provide one or more design elements to be included in the birthday card. For instance, the user may select a font and/or color to be used for the text of the birthday card.

At 606, the electronic marketplace generates an order requesting the one or more items and the greeting card. For example, in response to the user's selection, the electronic marketplace may generate an order requesting fulfillment of the user's purchase of the bicycle and the birthday card. Further, the order may include instructions to be used by the recordation station 108 to produce the birthday card.

At 608, the request order is communicated to a management module of a fulfillment system. For example, an order requesting the bicycle and the greeting card may be sent to the management module 102 of the fulfillment system 100.

Figure 7:
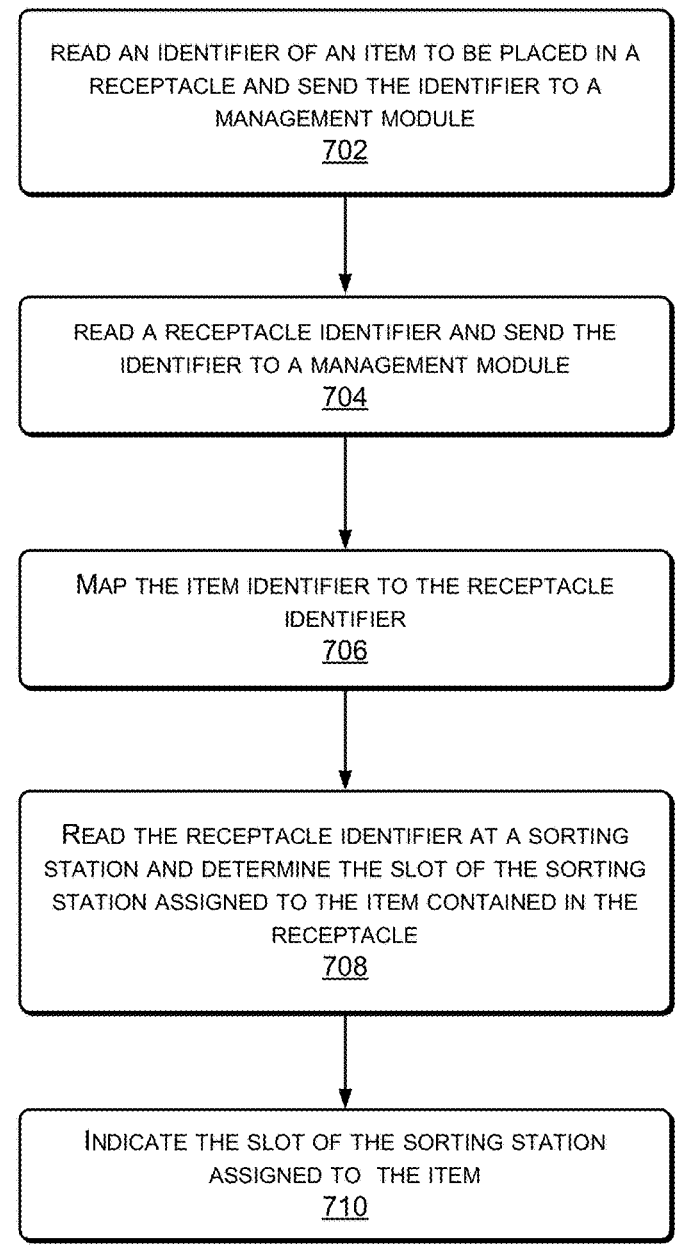
FIG. 7 is a flow diagram illustrating an exemplary process executed by one or more computing devices for sorting objects within a fulfillment system.

FIG. 7 shows the basic sorting process 700 that may be implemented by the fulfillment system 100. The process is illustrated as a collection of blocks in a logical flow graph. Some of the blocks represent actions taken by the conveyance system or sorting station under the direction of computer-implemented operations performed at the management module. In the context of software-based operations, the blocks represent computer-executable instructions stored on one or more computer-readable storage media that, when executed by one or more processors, direct the management module 102, conveyance system 106 and/or sorting station 110 to perform the recited acts. The order in which the operations are described is not intended to be construed as a limitation, and any number of the described blocks can be combined in any order or in parallel to implement the processes. It is understood that the following processes may be implemented with other architectures than the fulfillment system 100 described above.

At 702, an item identifier 120 of an item 116 to be placed in the receptacle 122 is read off of the item 116 and sent to the management module 102. For example, the bicycle purchased as a gift may be retrieved from an inventory system 104 of the fulfillment system 100. Further, an item identifier 120 associated with the bicycle may be identified and communicated to the management module 102.

At 704, a receptacle identifier 124 is read off of a receptacle 122 and sent to the management module 102. For example, the bicycle may be placed inside of the receptacle 122, and the receptacle identifier 124 may be read and communicated to the management module 102.

At 706, the management module 102 maps the item identifier 120 to the receptacle identifier 124 within the fulfillment system 100. For example, the management module 102 may maintain a data structure within its tracking module 410 that stores a temporary association between the item identifier 120 of the bicycle and the receptacle identifier 124 of the receptacle 122 containing the bicycle.

At 708, the receptacle identifier 124 is read off of the receptacle 122 at or near the sorting station 110, and the slot of the sorting station 110 associated with the item 116 is determined. The sorting station 110 may send a message to the management module 102 requesting the location of the slot assigned to the item 116. In some implementations, the message may include the receptacle identifier 124. In response, the management module 102 may respond with a message including the slot of the sorting station 110 assigned to the item 116 placed in receptacle 122 with the receptacle identifier 124. For example, an agent 126 at the sorting station 110 may retrieve the receptacle 122 and read the receptacle identifier 124 using the sensing device 204. Once the receptacle identifier 124 has been read, it may be communicated to the management module 102. The management module 102 may determine a location of the sorting station 110 associated with the bicycle inside of the receptacle 122 based in part on data stored within the tracking module 410 of the management module 102. Further, the location may be communicated to the sorting station 110.

At 710, the sorting station 110 may indicate the slot of the sorting station 110 that has been assigned to the item 116 placed inside of the receptacle 122. For example, the location may be presented to the agent 126 on the sensing device 204 at the sorting station 110.

Figure 8:
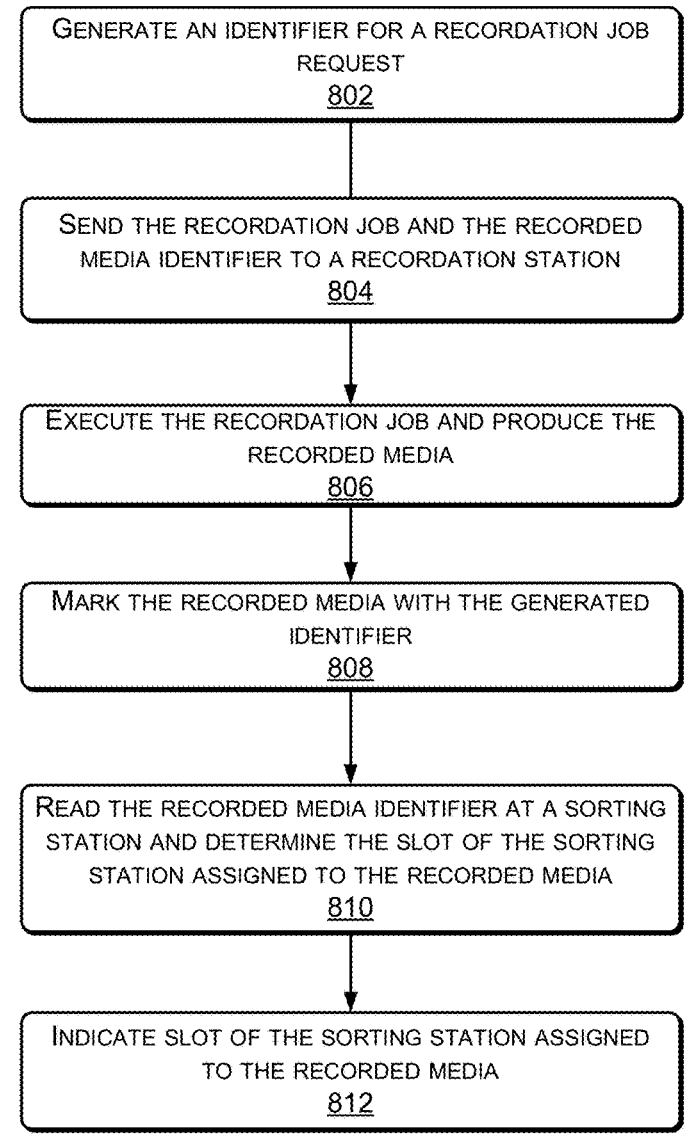
FIG. 8 is a flow diagram illustrating an exemplary process executed by one or more computing devices for managing recordation jobs within a fulfillment system.

FIG. 8 shows the basic recordation job process 800 that may be implemented by the fulfillment system 100. The process is illustrated as a collection of blocks in a logical flow graph. Some of the blocks represent actions taken by the conveyance system or sorting station under the direction of computer-implemented operations performed at the management module. In the context of software-based operations, the blocks represent computer-executable instructions stored on one or more computer-readable storage media that, when executed by one or more processors, direct the management module 102, recordation station 108 and/or sorting station 110 to perform the recited acts. The order in which the operations are described is not intended to be construed as a limitation, and any number of the described blocks can be combined in any order or in parallel to implement the processes. It is understood that the following processes may be implemented with other architectures than the fulfillment system 100 described above.

At 802, the management module 102 generates a recorded media identifier 128 and recordation job for a recorded media request. For example, the management module 102 may receive the order requesting the bicycle and the greeting card. In response, the management module 102 may generate a recorded media identifier 128 for the requested greeting card and convert the recorded media request into a recordation job. In some examples, the recordation job may include one or more instructions representing design elements of the requested greeting card.

At 804, the management module 102 sends the recordation job and the recorded media identifier 128 to the recordation station 108. For example, the management module 102 may send a message to the recordation station 108 comprising the recorded media identifier 128 and a print job comprising instructions to print the greeting card with green font color using a sans-serif typeface. In some examples, the recordation job may further include instructions to print a text statement that has been provided by the user that purchased the greeting card.

At 806, the recordation station 108, e.g., the recordation engine 510, executes the recordation job and produces the recorded media 118. For example, the recordation station 108 may receive the print job and print the greeting card with a green font color and sans-serif typeface. Further, the recordation station 108 may be used to print a coupon, promotional material, promotional offer, advertisement, three dimensional object, and/or record data to a CRSM.

At 808, the recordation station 108 marks the recorded media 118 with the recorded media identifier 128. For example, the recordation station 108 may affix a RFID label representing the recorded media identifier 128 to the printed greeting card. Alternatively, the recorded media identifier 128 may be represented by a bar code, 2D/3D bar code, QR code, NFC tag, magnetic stripe, or some other scannable or readable mechanism, mark, or tag attached to or integrated with the recorded media 118. Further, in some examples, the recorded media 118 may be placed into a container (e.g., envelope, slip, etc.), and the recorded media identifier 128 may be affixed to the container.

At 810, the recorded media identifier 128 is read at or near the sorting station 110, and the slot of the sorting station 110 associated with the recorded media 118 and one or more associated items 116 is determined. The sorting station 110 may send a message to the management module 102 including the recorded media identifier 128 requesting the location of the slot assigned to the recorded media 118. In response, the management module 102 may respond with a message including the slot of the sorting station 110 assigned to the recorded media 118 associated with recorded media identifier 128. For example, an agent 130 at the recordation station 108 may retrieve the greeting card, and transport the greeting card to the sorting station 110. At or near the sorting station 110, the recorded media identifier 128 may be read by the sensing device 204 and communicated to the management module 102. The management module 102 may determine a location of the sorting station 110 associated with the greeting card based in part on data stored within the tracking module 410 of the management module 102. Further, the location may be communicated to the sorting station 110.

At 812, the sorting station 110 may indicate the slot of the sorting station 110 that has been assigned to the recorded media 118 with the recorded media identifier 128. For example, the location may be displayed to the agent 130 at the sorting station 110 via the sensing device 204. Further, in some examples, the indicator may be a light, an audio signal, or some other mechanism or combination of mechanisms capable of conveying audio, visual, and/or other information to a human operator. Alternatively, the indicator may be textual or graphical directions displayed on a monitor of a computer, hand-held device, or printed paper.

Figure 9:
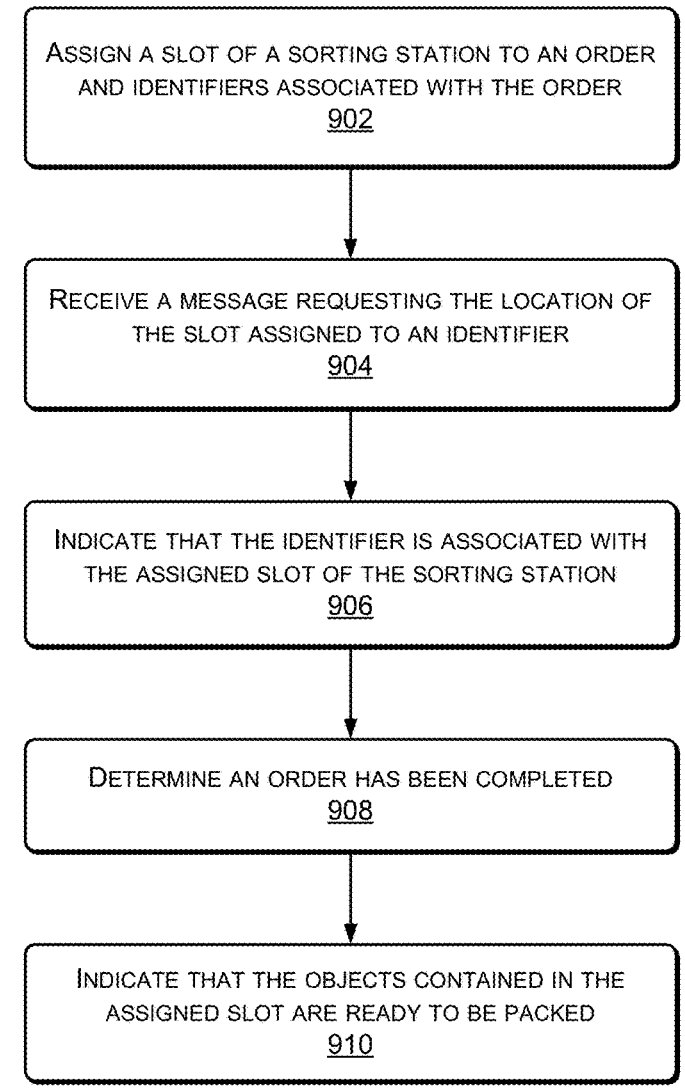
FIG. 9 is a flow diagram illustrating an exemplary process executed by one or more computing devices for managing fulfillment orders within a fulfillment system.

FIG. 9 shows the basic order tracking process 900 that may be implemented by the fulfillment system 100. The process is illustrated as a collection of blocks in a logical flow graph. Some of the blocks represent actions taken by the conveyance system or sorting station under the direction of computer-implemented operations performed at the management module. In the context of software-based operations, the blocks represent computer-executable instructions stored on one or more computer-readable storage media that, when executed by one or more processors, direct the management module 102, conveyance system 106 and/or sorting station 110 to perform the recited acts. The order in which the operations are described is not intended to be construed as a limitation, and any number of the described blocks can be combined in any order or in parallel to implement the processes. It is understood that the following processes may be implemented with other architectures than the fulfillment system 100 described above.

At 902, the management station 102 assigns a slot of a sorting station 110 to an order requesting one or more items 116 and a recorded media. For example, upon receipt of the order requesting the bicycle and the greeting card, the management module 102 may assign an empty slot of the sorting station 110 to the bicycle and the greeting card.

At 904, the management module 102 receives a sorting station location request including an identifier. For example, the agent 126 at the sorting station 110 may retrieve the receptacle 122 containing the bicycle, and read the receptacle identifier 124 using the sensing device 204. Once the receptacle identifier has been read, the sorting station 110 may send a sorting station location request to the management module 102 containing the receptacle identifier 124.

At 906, the management module 102 provides the assigned slot in the sorting station 110 that is associated with the identifier to the sorting station 110. For example, the management module 102 may determine the slot location of the sorting station 110 associated with the receptacle identifier 124 of the receptacle 122 containing the bicycle. The slot location associated with the receptacle identifier 124 may then be communicated to the sorting station 110 as a reply to the sorting station location request.

At 908, the management module determines that the order has been completed (i.e., that all the items for the order have been placed in the assigned slot along with the recorded media). For instance, the management module 102 may determine that the order has been completed when the recorded media identifier 128, and the receptacle identifiers 124 of all the receptacles 122 holding items 116 of the order and/or the item identifiers 120 of all the items 116 of the order are read at or near the sorting station 110. For example, if the recorded media identifier 128 of the greeting card and the receptacle identifier 124 of the receptacle 122 containing the bicycle are read at the sorting station 110 and communicated to the management module 102, the management module 102 may determine that all of the items of the order have been placed in the assigned slot at the sorting station 110.

At 910, the management module 102 indicates that contents of the slot of the sorting station 110 are ready to be packed. For example, the sorting station 110 may visually indicate to the agent 132 that the contents of the slot of the sorting station 110 holding the bicycle and greeting card are ready to be packed at the packing station 112. Further, in some examples, the indicator may be a light, an audio signal, or some other mechanism or combination of mechanisms capable of conveying audio, visual, and/or other information to a human operator. Alternatively, the indicator may be textual or graphical directions displayed on a monitor of a computer, hand-held device, or printed paper.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving an order from an account, wherein the order comprises one or more items and a greeting card associated with the one or more items, the account being associated with a user;
   receiving, via an input to a user device associated with the user, custom content for inclusion in the greeting card;
   associating the custom content with the greeting card;
   generating a greeting card identifier unique to the associated custom content and the greeting card;
   depositing the one or more items in one or more receptacles for transport to a sorting station, wherein the one or more receptacles are labeled with one or more receptacle identifiers and the sorting station is one of a plurality of sorting stations associated with a fulfillment environment;
   associating one or more item identifiers of the one or more items and the one or more receptacle identifiers;
   transporting the one or more receptacles on a conveyance system to the sorting station, the sorting station having a plurality of storage locations;
   determining a printing station in proximity to the sorting station, the printing station being one of a plurality of printing stations associated with the fulfillment environment;
   based at least in part on the transporting the one or more receptacles on the conveyance system to the sorting station, sending a print job request associated with the greeting card to the printing station, the print job request providing instructions to the printing station to print a custom greeting card comprising the greeting card and the custom content;
   identifying one of the plurality of storage locations as a destination for the one or more items and the greeting card;
   creating a first association associating the one of the plurality of storage locations with the one or more receptacle identifiers;
   storing the first association in the memory;
   based at least in part on the first association, transferring the one or more items from the one or more receptacles into the one of the plurality of storage locations of the sorting station;
   executing the print job request at the printing station to generate a printed media representation of the custom greeting card;
   tagging, via the printing station, the custom greeting card with the greeting card identifier;
   creating a second association associating the greeting card identifier with the one of the plurality of storage locations;
   storing the second association in the memory;
   based at least in part on the second association, transferring the printed media representation of the custom greeting card into the one of the plurality of storage locations; and
   detecting that the one or more items and the custom greeting card have been placed in the one of the plurality storage.

2. The computer-implemented method of claim 1 wherein the detecting that the one or more items and the greeting card of the order have been placed further comprises detecting that the one or more items and the greeting card of the order have been placed within the one storage location of the sorting station based in part on reading at least one of the one or more receptacle identifiers, the item identifiers or the greeting card identifier with a sensing device located at the sorting station.

3. The computer-implemented method of claim 1, wherein the receiving the custom content comprises receiving a selection of one or more design elements of the greeting card.

4. The computer-implemented method of claim 3, the receiving the custom content further comprising:
   receiving data associated with an alteration of the one or more design elements, the data corresponding to at least one of a content, size, or layout of the greeting card.

5. A system comprising:
   a plurality of receptacles configured to receive one or more items of inventory, individual receptacles of the plurality of receptacles including a receptacle identifier;
   a conveyance system to transfer the plurality of receptacles;
   a printing station to generate printed media;
   a sorting station including a plurality of storage locations; and
   a management module comprising program instructions, wherein the program instructions are executable by a processor to:
      receive an order from an account, the order comprising an identification of an item and an identification of printed media to be associated with the item, the account being associated with a user;

receive, via an input to a user device associated with the user, custom content for inclusion in the printed media;

associate the custom content with the printed media;

generate a printed media identifier unique to the associated custom content and the printed media;

cause the item to be deposited in a receptacle of the plurality of receptacles for transport to the sorting station;

associate an item identifier of the item with the receptacle identifier associated with the receptacle;

transport the receptacle on a conveyance system to the sorting station;

based at least in part on the transporting the receptacle, send a print job request associated with the printed media to the printing station, the print job request providing instructions to the printing station to print a custom printed media comprising the printed media and the custom content;

identify a storage location of the plurality of storage locations as a destination for the item and the printed media;

create a first association associating the one of the plurality of storage locations with the receptacle identifier;

store the first association in memory;

based at least in part on the first association, transfer the item from the receptacle into the storage location;

execute the print job request at the printing station to generate the custom printed media;

tag, via the printing station, the printed media with the printed media identifier;

create a second association associating the printed media identifier with the storage location;

store the second association in the memory;

based at least in part on the second association, transfer the custom printed media into the storage location; and detect that the item and the custom greeting card have been placed in the storage location.

6. The system of claim 5, further comprising a sensing device at the sorting station, and wherein the management module performs the detecting by directing the sensing device to read an item identifier associated with the item and to read the printed media identifier.

7. The system of claim 5, wherein the request to the printing station includes the printed media identifier.

8. The system of claim 5, further comprising an indicator associated with the storage location, the indicator identifying the storage location as a holding destination for at least one of the item or the custom printed media.

9. The system of claim 8, wherein the indicator comprises a light at the storage location, and the management module further comprises program instructions executable by the processor to illuminate the light in response to detecting that the item and the custom greeting card have been placed in the storage location.

10. The system of claim 5, wherein the printing station includes a three-dimensional printer configured to print three dimensional objects and the request to the printing station includes printing instructions for a three dimensional object.

11. The system of claim 5, wherein the printed media is a greeting card.

12. The system of claim 5, wherein the content of the printed media is based, at least, in part on the item.

13. A method comprising:

receiving an order from an account, the order comprising an indication of an item and an identification of a printed media item associated with the item;

receiving custom content for inclusion in the printed media item;

associating the custom content with the printed media item;

generating a printed media identifier unique to the associated custom content and the printed media item;

depositing the item in a receptacle for transport to a sorting station, wherein the receptacle is labeled with a receptacle identifier and the sorting station is one of a plurality of sorting stations associated with a fulfillment environment;

associating an item identifier of the item with the receptacle identifier;

transporting the receptacle on a conveyance system to the sorting station, the sorting station having a plurality of storage locations;

determining a printing station in proximity to the sorting station, the printing station being one of a plurality of printing stations associated with the fulfillment environment;

sending a print job request associated with the printed media item to the printing station, the print job request providing instructions to the printing station to print a custom printed media item comprising the printed media item and the custom content;

identifying a storage location of the plurality of storage locations as a destination for the item and the custom printed media item;

creating a first association associating the storage location with the receptacle identifier;

storing the first association in memory;

based at least in part on the first association, transferring the item from the receptacle into the storage location;

executing the print job request at the printing station to generate the custom printed media item;

tagging, via the printing station, the custom printed media item with the printed media identifier;

creating a second association associating the printed media identifier with the storage location;

storing the second association in the memory;

based at least in part on the second association, transferring the custom printed media item into the storage location.

14. The method of claim 13, further comprising determining web browsing activity associated with the account; and determining a media object based at least in part on the browsing activity, wherein the print job request further provides instructions to print the media object.

15. The method claim 13, further comprising:

receiving, from a vendor, design information that includes at least one of a style, appearance, content, color scheme, font, or layout for the custom printed media item; and receiving selection of the design information, wherein the printing the custom media object is based at least in part on the design information.

16. The method of claim 15, further comprising providing a payment to the vendor based at least in part on the printing the custom media object.

17. The method of claim 13, further comprising detecting that the item and the custom printed media item have been placed in the storage location.

18. The method of claim 17, wherein the detecting is based in part on reading at least one of the receptacle identifier, the item identifier or the printed media identifier with a sensing device located at the sorting station.

19. The method of claim 13, the receiving the custom content further comprising:
- receiving data associated with an alteration of one or more design elements of the printed media item, the data corresponding to at least one of a content, size, or layout of the printed media item.

* * * * *